Dec. 1, 1931.                E. D. WARDE                1,834,362
                          AUTOMOBILE BRAKE
                        Filed Dec. 27, 1928
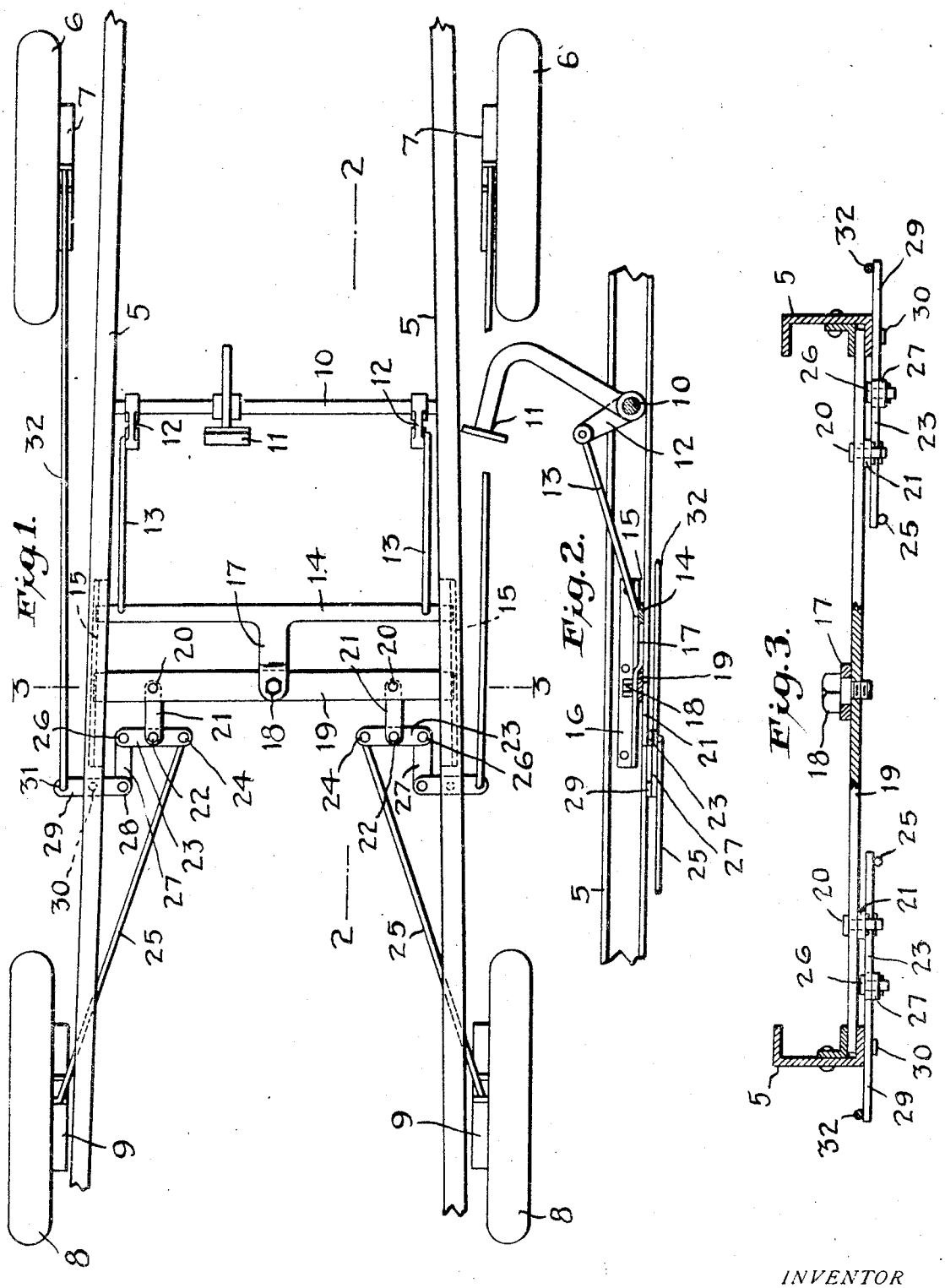
INVENTOR
Edgar D. Warde,
BY
HIS ATTORNEY Patented Dec. 1, 1931

1,834,362

UNITED STATES PATENT OFFICE

EDGAR D. WARDE, OF ARLINGTON, NEW JERSEY

AUTOMOBILE BRAKE

Application filed December 27, 1928. Serial No. 328,724.

The invention relates to automobile brakes and particularly to systems where the brakes are simultaneously applied to all four wheels of the car.

It is desirable for reasons of safety and efficiency to have the braking pressure equalized or balanced on all four wheels. The object of the present invention is to provide such a braking mechanism which is entirely reliable in operation and of an exceedingly simple nature. The novel braking means hereinafter disclosed has the further advantage of being easy to construct, durable in use, inexpensive to manufacture and it may be applied to any make of automobile without material alterations if not applied to the car at the point of manufacture.

The invention contemplates an equalizer bar and means for guiding and actuating this equalizer bar. Suitable connections are provided between the equalizer bar and the four brakes on the car so that the pressure will be distributed evenly when applied by the actuating means.

Other objects and advantages will appear from the following specification taken in connection with the drawings forming a part thereof and in which one embodiment or arrangement of the invention is illustrated, it being understood that this is set forth by way of example and that the invention may take various forms depending upon the nature and character of the vehicle in which the braking mechanism is to be incorporated. In said drawings:

Fig. 1 is a schematic plan view;

Fig. 2 is a fragmentary longitudinal sectional view taken on line 2—2 of Fig. 1; and Fig. 3 is a cross sectional view taken on line 3—3 of Fig. 1.

The frame of the car is designated by the reference numerals 5—5. The front wheels are indicated diagrammatically at 6—6 and have mechanical brakes 7—7 of any well known type. The rear wheels 8—8 also have mechanical brakes 9—9. As the construction of the wheels and brakes and other parts of the chassis are well known it is not thought necessary that they be illustrated in detail.

A rock shaft 10 is suitably journaled in the frame members 5 and carries an ordinary foot pedal 11. Secured at opposite ends of the rock shaft 10 and adjacent the frame members are short levers 12. The levers 12 are connected by links 13 to a draw bar 14 which is mounted in guides 15 formed by the lower flange of the frame members and angles 16 secured to the webs of the frame members. The draw bar 14 has an ear 17 extending from its central portion and pivoted at 18 in this ear is the equalizer bar 19 which is also guided at its ends in the guides 15.

The foregoing forms the means for actuating the equalizer bar and it will be apparent from an inspection of the drawings that when pressure is applied to the foot pedal 11 it will cause the draw bar 14 to move forward without canting. The equalizer bar 19 will also move forward in its guides 15 but by virtue of being pivoted in the middle it is free to swing one way or the other so as to equalize or balance the pressure which is transmitted to the four brakes in a manner hereinafter described. The herein disclosed actuating means for the equalizer bar is typical of only one example for accomplishing the desired result and it may be widely varied without departing from the spirit of the invention.

Pivoted at 20 on opposite ends of the equalizer bar 19 are links 21, these links in turn being pivoted at 22 to levers 23. Pivoted at 24 to the levers 23 are the connections 25 to the rear wheel brakes 9. Thus, when the equalizer bar 19 is moved forward the brakes 9 will be tightened, the pressure on the two brakes being evenly distributed or balanced by virtue of the equalizer bar.

Pivoted at 26 on the opposite ends of levers 23 are other links 27 which in turn are pivoted at 28 to a second set of levers 29. The levers 29 are pivoted at 30 to the frame members 5. Pivoted at 31 to the levers 29 are connections 32 running to the front wheel brakes 7. It will thus be plain from the foregoing description and the drawings that the pressure will be evenly distributed to the front wheel brakes as well as the rear wheel brakes through the medium of the equalizer bar 19 and aforesaid linkage.

In accordance with the invention the linkage and connections to the front and rear wheel brakes may likewise be widely varied, the essential feature of the invention being to provide an equalizer bar having means for guiding it and means for actuating it and connections to the four wheels whereby the pressure may be equally distributed, in this way avoiding the accurate adjustment of the brakes which is necessary for safety and efficiency.

In order that slightly more braking effect may be produced in the rear wheels than the front, the width of the rear wheel brake is shown as somewhat greater than that of the front wheel brake. However this might readily be accomplished in other ways such, for instance, as making the springs in the front wheel brakes somewhat stronger than those of the rear wheel brakes or by changing the position of the pivots or fulcrums of the levers 23 or 29.

In Fig. 1 the parts are shown in the position they would occupy in their normal condition or with the brakes not applied. After the brakes have been applied the parts are again returned to the position of Fig. 1 by the ordinary springs in the conventional mechanical brakes. The equalizer bar and its associated linkage might be considered as balanced between the springs in the four brakes of the car and when the equalizer bar is moved by its actuating mechanism the pressure must be equalized or evenly distributed to all four wheels. Obviously other means might be employed to bring the brakes to their release position and return the equalizer bar and its associated parts to their normal position.

Applicant is aware that an equalizer bar has been used to equalize the pressure between two of the brakes of a car but he believes it to be new with him to provide a guided equalizer bar which will evenly distribute the pressure to all four brakes of an automotive vehicle.

For economy of illustration some of the parts disclosed in the drawings, particularly the linkage between the equalizing bar and the connections to the brakes are somewhat larger in proportion to the other parts than they would be in practice.

Numerous changes may be made in details of construction and arrangements of parts from that disclosed in the embodiment illustrated and all such changes would be considered as coming within the spirit of the invention as set forth in the appended claims.

I claim:

1. A four wheel brake system for automotive vehicles having in combination, a frame having wheels journaled at opposite ends thereof, brakes controlling the rotation of said wheels and means for equalizing the pressure applied to said brakes, said means including an equalizer bar, actuating means for said equalizer bar, means for guiding said equalizer bar in a substantially horizontal plane, links pivoted to said equalizer bar, levers pivoted to said links, one end of said levers being connected to the brakes on the rear wheels, links connecting the other ends of said levers to other levers pivoted on said frame and connections from the opposite ends of said last mentioned levers to the brakes on the front wheels.

2. A four wheel brake system for automotive vehicles having in combination, a frame having wheels journaled at opposite ends thereof, brakes controlling the rotation of said wheels, connections to said brakes, and means for equalizing the pressure applied to said brakes, said means including a draw-bar, an equalizer bar connected at approximately its central portion to said draw-bar, means for guiding said equalizer bar and said draw-bar in a substantially horizontal plane, actuating means for said draw-bar, and linkage between said equalizer bar and said connections to the brakes.

3. A four wheel brake system for automotive vehicles having in combination, a frame having wheels journaled at opposite ends thereof, brakes controlling the rotation of said wheels, and means for equalizing the pressure applied to said brakes, said means including an equalizer bar, means for supporting and guiding said equalizer bar in a substantially horizontal plane, actuating means for said equalizer bar, links pivoted to said equalizer bar, and levers pivoted to said links, one end of said levers being connected to the brakes on the rear wheels and the other end of said levers being connected by suitable linkage to the brakes on the front wheels.

4. A four wheel brake system for automotive vehicles having in combination, a frame having wheels journaled at opposite ends thereof, brakes controlling the rotation of said wheels, and means for equalizing the pressure applied to said brakes, said means including a draw-bar, an equalizer bar connected to said draw-bar, means for supporting and guiding said equalizer bar and said draw-bar in a substantially horizontal plane, actuating means for said draw-bar, links pivoted to said equalizer bar, and levers pivoted to said links, one end of said levers being connected to the brakes on the rear wheels and the other end of said levers being connected by linkage to the brakes on the front wheels.

In testimony whereof I affix my signature.

EDGAR D. WARDE.